F. R. CORNWALL.
ELECTRIC SWITCH.
APPLICATION FILED JULY 17, 1918.
1,401,587.
Patented Dec. 27, 1921.
2 SHEETS—SHEET 2.
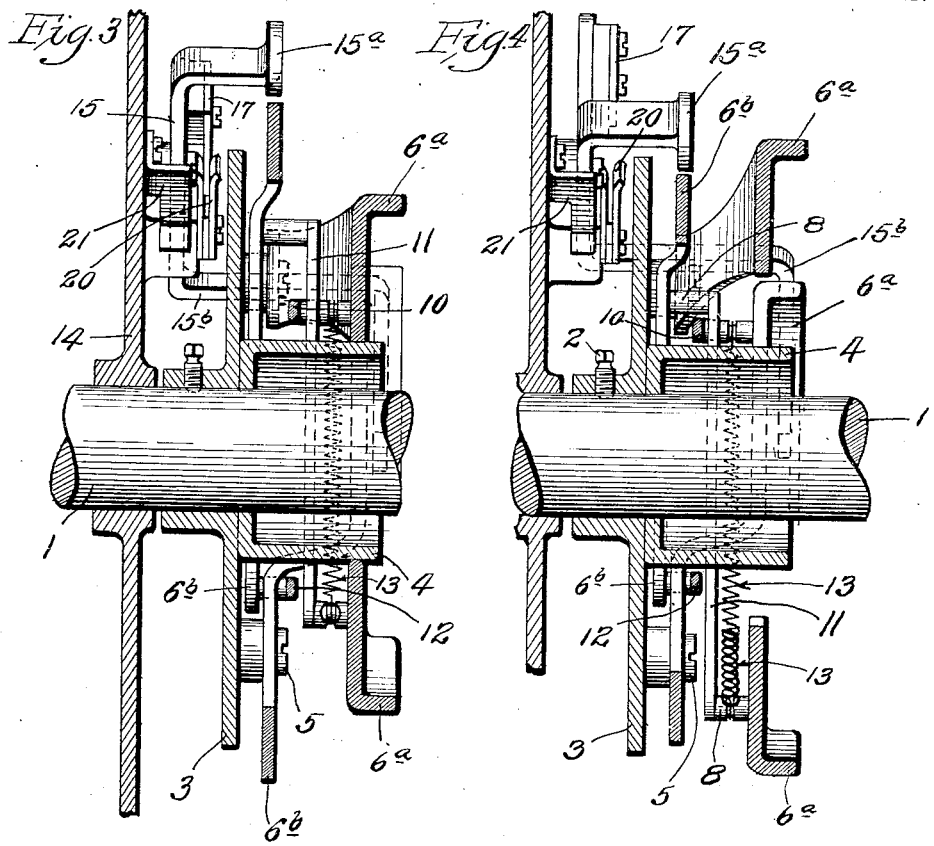
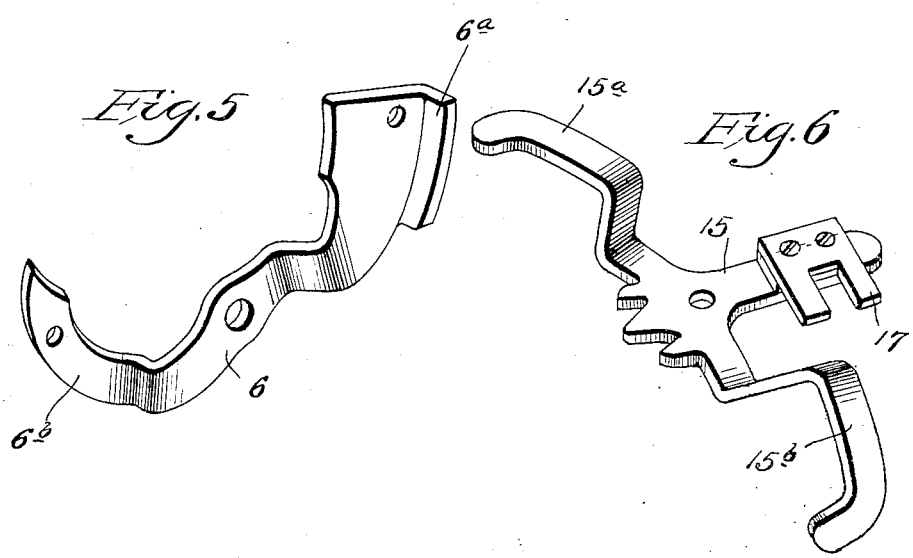
Inventor
F. R. Cornwall.

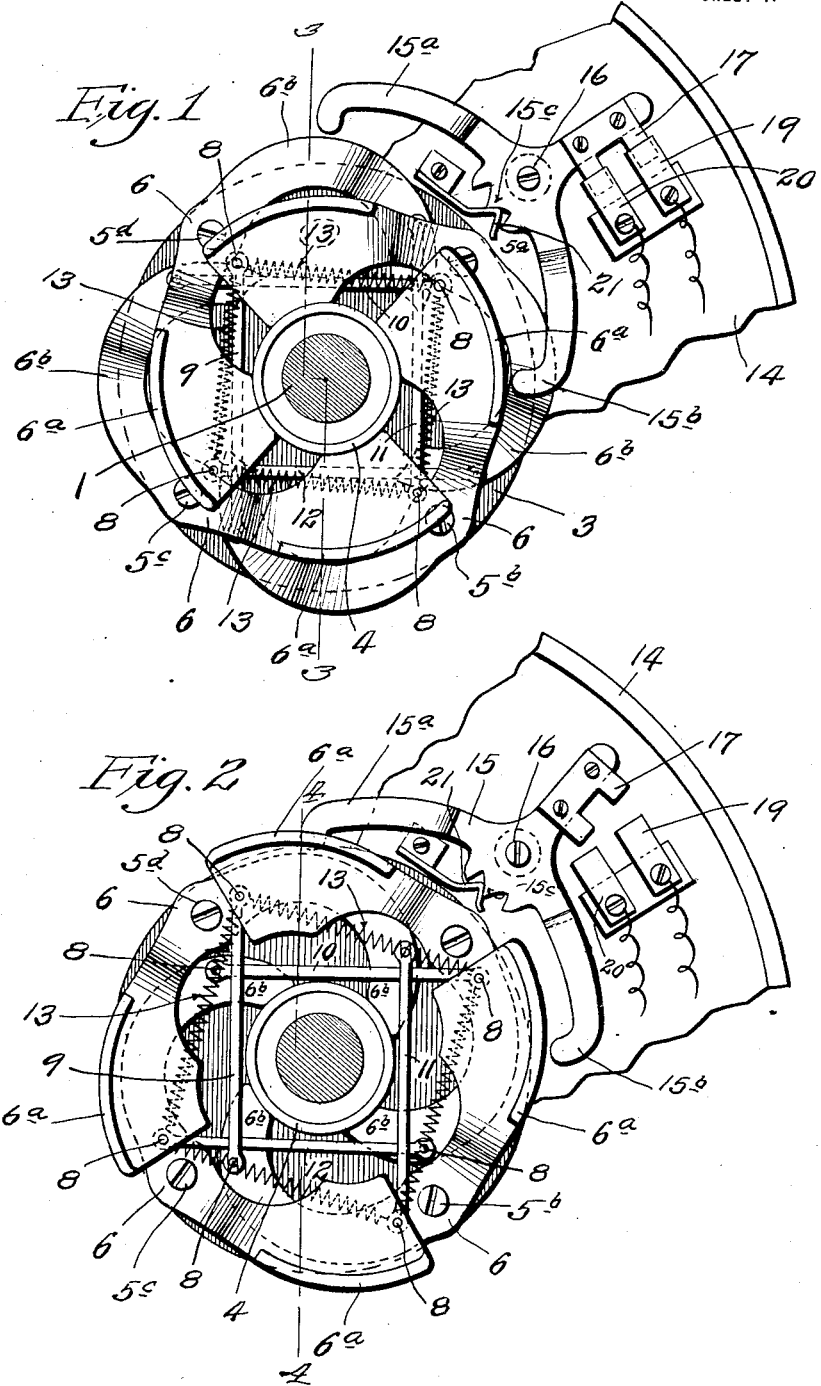

UNITED STATES PATENT OFFICE.

FREDERICK R. CORNWALL, OF ST. LOUIS, MISSOURI, ASSIGNOR TO THE EMERSON ELECTRIC MANUFACTURING COMPANY, OF ST. LOUIS, MISSOURI, A CORPORATION OF MISSOURI.

ELECTRIC SWITCH.

1,401,587. Specification of Letters Patent. Patented Dec. 27, 1921.

Application filed July 17, 1918. Serial No. 245,276.

*To all whom it may concern:*

Be it known that I, FREDERICK R. CORNWALL, a citizen of the United States, residing at the city of St. Louis, State of Missouri, have invented a certain new and useful Improvement in Electric-Switches, of which the following is a full, clear, and exact description, such as will enable others skilled in the art to which it appertains to make and use the same, reference being had to the accompanying drawings, forming a part of this specification, in which—

Figure 1 is a side elevational view of my improved electric switch.

Fig. 2 is a similar view showing the parts in a changed or different position.

Fig. 3 is a sectional view on line 3—3 of Fig. 1.

Fig. 4 is a sectional view on line 4—4 of Fig. 2.

Fig. 5 is a detail view of one of the centrifugally operated members.

Fig. 6 is a detail view of a switch arm operated by the centrifugally operated members.

This invention relates to a new and useful improvement in electric switches designed especially for use in connection with electric motors wherein is employed a starting coil used in attaining speed in the motor after the same is first energized, as in turning on the current to start the motor, and which starting coil or coils is or are cut out when the motor attains speed. When the speed of the motor decreases, or the rotary element thereof is brought to a standstill, the starting coils are again cut in, in readiness for another operation.

My invention consists in the novel construction and arrangement of the centrifugally operated elements which are caused to revolve from the rotary member of the motor, such as the armature shaft thereof, which may carry said centrifugally operated elements, in combination with a stationary switch, preferably in the form of a rocking lever, one leg of which is moved outwardly to throw the switch in one direction and to cut out the starting coils when the motor attains speed, and the other leg of which is moved outwardly by the centrifugally operated elements when the speed of the motor decreases, so as to close the circuit through the starting coils.

The novel feature of my invention consists in revolving the pivotally mounted unbalanced centrifugally operated elements whereby, as the speed of the motor increases, starting from a position of rest, the heavier end or ends of said centrifugally operated elements will be thrown outwardly by centrifugal force to operate the stationary switch in one direction (to open the starting coils) there being means, such as springs, connected to said heavier ends of the centrifugally operated elements to draw them inwardly toward their center of rotation, as the speed of the motor decreases, or if brought to a standstill, thereby moving the opposite ends of said centrifugally operated elements outwardly to coöperate with the switch to move said switch in an opposite direction or in a direction to close the circuit through the starting coils. Briefly stated, therefore, the centrifugally operated elements throw the switch first in one direction, on an increasing speed, and then in the opposite direction, on a decreasing speed, by the engagement of the outer peripheries only of said centrifugally operated elements.

Another feature of my invention resides in the novel manner of connecting the centrifugally operated elements together, whereby they are caused to move in unison,— in this way obviating the possibility of one of said elements, due to the smaller spring resistance or a heavier weighted end, moving ahead of the others, or vice versa.

Another feature of my invention resides in the arrangement of the opposite ends of the centrifugally operated elements in different planes of revolution, and in constructing the stationary switch with engageable parts whereby it will first be operated in one direction and then in an opposite direction by the ends of the centrifugally operated elements traveling in the planes or paths of rotation beforementioned.

In the drawings, 1 indicates an armature shaft on which is secured, as by means of set screws 2, a disk 3, from which extends a flange 4 forming a hub-like extension substantially in the form of an open-ended cylinder.

Pivotally mounted on the disk 3, preferably by means of stud screws 5, are centrifugally operated elements 6. These elements consists of a heavier or weighted end, preferably provided with an inwardly extending flange 6ª located to one side of the pivotal point 5 and of the tail-like extension 6ᵇ of less width than the heavier head portion, said tail-like extension being located on the opposite side of the pivot point 5. There are preferably jogs or bends in the length of the centrifugally operated elements whereby the head portion of one may overlap the tail portion of another so as to provide sufficient clearance for the operation of each.

The head and tail portions of each centrifugally operated element are provided with openings in which are arranged studs or pins 8, on which studs or pins are mounted articulated links 9, 10, 11 and 12. These links are separately numbered because, while substantially alike in construction, purpose, and function, they operate in a peculiar manner which may best be described by referring to each one separately.

Link 9 connects the head portion 6ª of the centrifugally operated element mounted on the stud screw 5ª with the tail portion 6ᵇ of the centrifugally operated element mounted on the stud screw 5ᵇ. The head portion of the centrifugally operated element mounted on the stud screw 5ᵇ is connected by a link 10 to the tail portion of the centrifugally operated element which is mounted on the stud screw 5ᶜ. The head portion of the centrifugally operated element mounted on said stud screw 5ᶜ is connected by link 11 to the tail portion of the centrifugally operated element mounted on stud screw 5ᵈ; and the head portion of the centrifugally operated element on stud screw 5ᵈ is connected by link 12 to the tail portion of the centrifugally operated element mounted on stud screw 5ª, whose head portion, as just above described, is connected by the link 9 to the tail portion of the said centrifugally operated element mounted on the stud screw 5ᵇ.

In this manner, all of the centrifugally operated elements are articulated to move together, i. e., their head and tail portions inwardly or outwardly, as the case may be. If desired, the openings in the links 9 where they engage pins 7 may be slightly larger than said pins to compensate for irregularities in manufacture, but in practice, this may not be found to be necessary, as the pins 7 should be located the same radial distance from the pivotal points provided by the stud screws 5ª, etc. In this manner the links will be balanced in their movement and have no tendency to bind.

The springs for moving the heads of the centrifugally operated devices inwardly are indicated at 13, and I find it expedient to utilize the pins 7 as posts to which the ends of these springs may be connected. All of these springs are preferably placed under tension when applied in position and so remain under tension in operation.

Referring now to Figs. 1 and 2, it will be seen that the opposite ends of these springs 13 are connected respectively to the next adjacent heads of all of the centrifugally operated elements so that the tension of all of the springs is exerted at all times to draw these heads inwardly until said heads are arrested by contacting with the flanged hub 3, as shown in Fig. 3. When the motor is started and centrifugal force acts upon these heavier head portions to force them outwardly, the springs will be placed under greater tension as the heads move outwardly, said tension increasing gradually until the tail portions of the centrifugally operated elements engage the hub flange 3.

Numeral 14 indicates the portion of the motor casing which in this instance is shown as a portion of the removable end plate. On the stationary wall 14 is pivotally mounted a Y-shaped switch member 15 pivoted to the wall 14 at 16. The stem member of this Y-shaped switch carries a contact-making element 17 which is designed to coöperate with contacts 19 and 20 forming the terminals of the starting coil or coils. When the parts are in the position shown in Fig. 1, the circuit through the starting coil or coils is closed by the switch, and in this position of the parts the motor is at rest. When the motor attains speed and the switch is thrown, as shown in Fig. 2, the circuit through the starting coil or coils will be broken. I have not shown any insulation for the switch or the terminal contacts for the starting coil or coils, as this may be employed in a manner well known in the art.

When the leg or tappet 15ª of the Y-shaped switch member, or rather the outer extremity thereof, is arranged in the plane or path of movement of the tail portions 6ᵇ of the centrifugally operated elements, the other leg or tappet 15ᵇ which is offset with respect to the tappet 15ª is arranged in the plane or path of outward movement of the flanges 6ª on the heads of the centrifugally operated elements. A detent 15ᶜ coöperates with a spring 21 whereby the switch arm will be held in either position by what might be designated as a snap action, i. e., the switch arm will be snapped to its open or closed position as permitted by the position of the centrifugally operated elements.

While I have shown four centrifugally operated elements in the accompanying drawings, it is obvious that a greater or fewer number may be employed, and it is also obvious that a different form of switch arm or contact making and breaking device capable of closing and opening the circuit, including the starting coils, may be used, and I therefore do not wish to be understood as limiting myself as to these features except as such limitations may be expressed in the claims.

What I claim is:

1. The combination of an electric switch having offset tappets, and centrifugally operated devices moving in different transverse planes for alternately coöperating with said tappets to open and close said switch.

2. A switch operating mechanism comprising a rotatable support, in combination with pivotally mounted unbalanced centrifugally operated devices carried thereby, the portions of said centrifugally operated devices on each side of their pivotal points moving outwardly respectively under increasing and decreasing speeds of said rotatable supports, and a switch having offset tappets coöperating with said devices.

3. A switch operating mechanism comprising a rotatable support, in combination with centrifugally operated devices carried thereby and movable inwardly and outwardly in different operative transverse planes, and spring connected to said centrifugally operated devices to operate them when the speed of the rotatable support decreases, and a switch having offset tappets coöperating with said devices.

4. A switch operating mechanism comprising a rotatable support, in combination with pivotally mounted unbalanced centrifugally operated devices carried thereby and movable inwardly and outwardly in different operative transverse planes, and springs connected to said pivotally mounted centrifugally operated devices, to one side of the pivotal points thereof, to operate them when the speed of the rotatable support decreases, and a switch having offset tappets coöperating with said devices.

5. A switch operating mechanism comprising a rotatable support, in combination with centrifugally operated devices carried thereby and movable inwardly and outwardly in different operative transverse planes, and means for articulating said centrifugally operated devices whereby they will move in unison, and a switch having offset tappets coöperating with said devices.

6. A switch operating mechanism comprising a rotatable support, in combination with pivotally mounted centrifugally operated devices carried thereby, said centrifugally operated devices consisting of over and under balanced portions arranged respectively on opposite sides of their pivotal support and traveling in different operative transverse planes, and a spring connected to the overbalanced end of one of said centrifugally operated devices and the underbalanced end of another.

7. A switch operating mechanism comprising a rotatable support, in combination with pivotally mounted centrifugally operated devices carried thereby, said centrifugally operated devices consisting of over and under balanced portions arranged respectively on opposite sides of their pivotal support and traveling in different operative transverse planes, and an articulating means connected to the overbalanced end of one of said centrifugally operated devices and the underbalanced end of another.

8. A switch operating mechanism comprising a rotatable support carrying centrifugally operated devices which are movable inwardly and outwardly in different operative transverse planes, in combination with a stationary switch having engageable off-set tappet members lying respectively in the paths of movement of the parts of said centrifugally operated devices.

9. A switch operating mechanism comprising a rotatable support, in combination with pivotally mounted centrifugally operated devices, articulating means connecting the overbalanced end of one centrifugally operated device to the unbalanced end of another, and a spring connected to the overbalanced ends of said centrifugally operated devices, said springs opposing the centrifugal force exerted upon the overbalanced end.

10. A switch operating mechanism comprising a rotatable support, in combination with centrifugally operated devices carried thereby and composed of members so connected together that when one connected member moves outwardly, the other member connected thereto moves inwardly, but in a different operative transverse plane, and vice versa, and a spring connected to said centrifugally operated device so as to permit outward movement of one member thereof and consequent inward movement of the other member thereof when the speed of the rotatable support increases, said spring operating said centrifugally operated device to cause the first mentioned member thereof to move inwardly and the last mentioned member thereof to move outwardly when the speed of the rotatable support decreases.

In testimony whereof I hereunto affix my signature this 15th day of July, 1918.

FREDERICK R. CORNWALL.